Patented Sept. 5, 1950

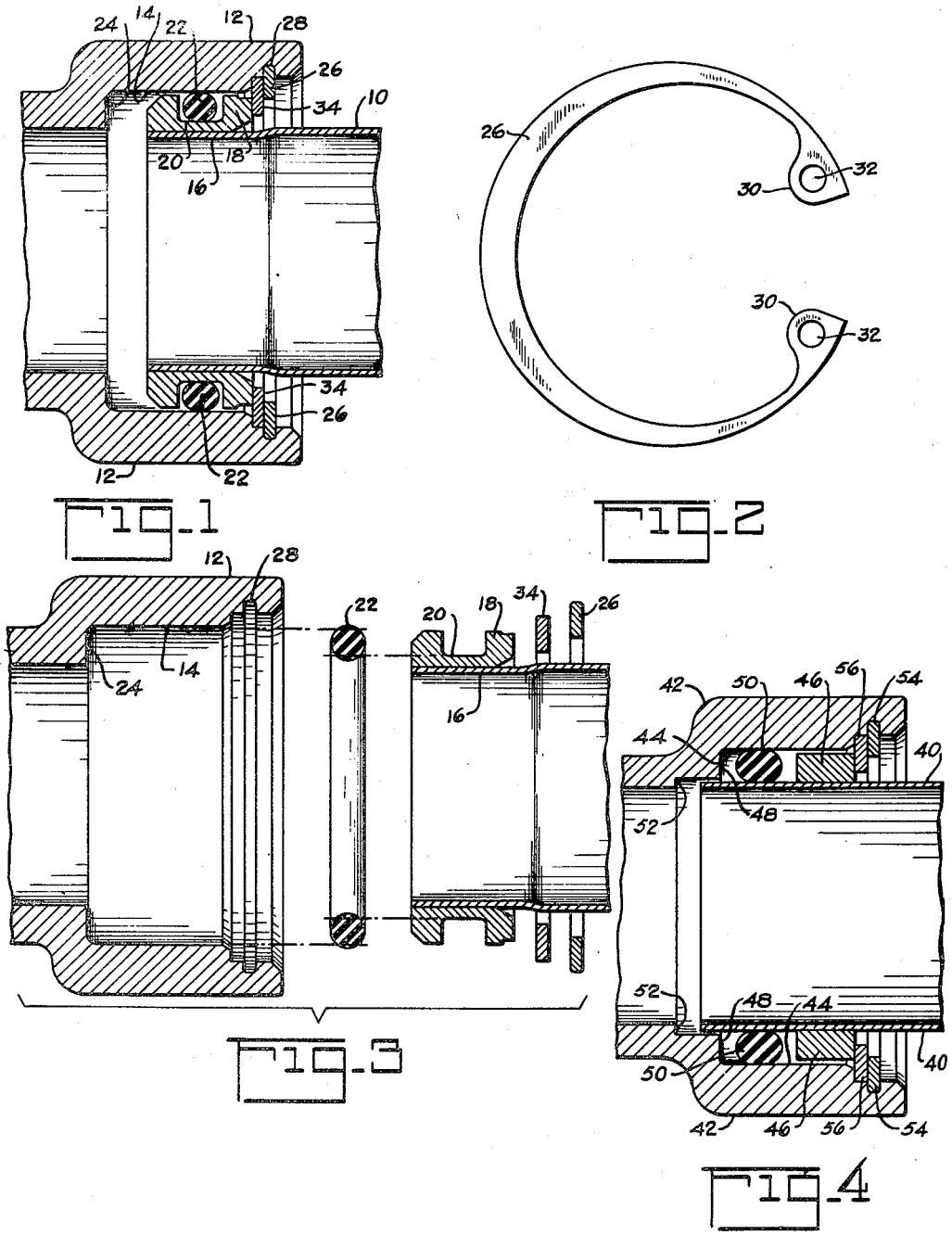

2,521,127

UNITED STATES PATENT OFFICE 2,521,127

FLUID TIGHT JOINT

Harry N. Price, East Paterson, N. J., assignor to Wright Aeronautical Corporation, a corporation of New York Application May 8, 1948, Serial No. 25,978

7 Claims. (Cl. 285—90)

This invention relates to fluid tight tube or pipe joints and is particularly directed to a fluid tight joint which does not require predetermined adjustment of a tightening member, such as a nut, in order to insure proper assembly of the joint.

The invention has been designed for use in connection with oil and fuel pressure lines of aircraft engines. As will appear, however, the invention is of general application. Aircraft engines require a large number of oil and fuel lines and for reasons of assembly and fabrication a larger number of fluid tight joints are required in said lines. Such joints are frequently disposed in relatively inaccessible locations on the engine. Accordingly an object of this invention comprises the provision of a fluid tight joint which is relatively simple to assemble and in which no portion of the joint needs to be tightened or adjusted to make the joint fluid tight. A further object of the invention comprises the provision of a fluid tight joint in which the joined members are secured in fluid tight relation and against separation merely by snapping a split ring into position.

A still further object of this invention comprises the provision of a fluid tight joint in which the joined members are not rigidly connected together mechanically. In accordance with the present invention the joint has limited axial and angular freedom whereby small variations in the length and angularity of the joined members do not impose stresses on said members. In addition, the joint of the invention requires only a minimum of space and is light in weight, both of these features being quite important for any device intended for aircraft use.

Other objects of the invention will become apparent upon reading the annexed detailed description in connection with the drawing in which:

Figure 1 is an axial sectional view of a joint embodying the invention;

Figure 2 is an end view of a split ring incorporated in Figure 1;

Figure 3 is an exploded axial sectional view of Figure 1; and

Figure 4 is an axial view similar to Figure 1 but of a modification of the invention.

Referring first to Figures 1 to 3 of the drawing, a relatively thin walled tube 10 for conveying a fluid under pressure to or from a body member 12 extends into a cylindrical chamber or bore 14 within said body member. The inner end of the tube 10 is swaged diametrically inwardly slightly, as indicated at 16, to provide a more accurate control of the external diameter of said tube than is available in commercial tubing. A collar 18 is secured to and about the swaged end 16 of the tube 10—for example by brazing or welding. It is essential that the junction between the collar 18 and the tube end 16 be fluid tight.

An annular external groove 20 is machined in the collar 18, the external diameter of the bottom of said groove being accurately controlled. The resulting channel shaped cross-section of the collar 18 provides for maximum rigidity of said collar with a minimum of material. The external diameter of the channel sides of the collar 18 are slightly less than the internal diameter of the bore or chamber 14 thereby permitting slight misalinement or angularity of the tube 10 and body member 12. An annular packing ring 22 of resilient rubber-like material is disposed within the groove 20, between the bottom of said groove and the adjacent internal wall of the chamber or bore 14.

As illustrated in the exploded view of Figure 3, the packing ring 22, in its free condition, has a circular cross-section and has a free internal diameter which is slightly smaller than the diameter of the bottom of the groove 20 and has a free external diameter which is slightly larger than the internal diameter of the chamber or bore 14. As used in the specification and claims, by "free condition" and "free diameter" of the packing ring 22 is meant the condition and diameter, respectively, of said ring when no external forces, other than gravity, are applied thereto. With the packing ring 22 having said diametric dimensions, said ring is placed in radial compression when it is disposed between the bottom of the groove 20 and the internal wall of the chamber 14 thereby preventing leakage of fluid between the body member 12 and the collar 18 past the ring 22. It should also be noted that the axial length of the groove 20 is larger than the axial length of the packing ring 22 when said ring is compressed between the bottom of said groove and the internal wall of a chamber 14. This axial clearance at the ends of the resilient packing ring 22 improves its sealing properties over those obtainable with no such axial clearance. This improvement probably results from the fact that with said axial clearance, the high pressure within the joint acts against the entire left end (Figure 1) of the packing ring 22 to tightly squeeze said ring against the right end of the groove 20 as well as against the wall of the chamber 14 and the bottom of the groove 20. This assumes that the pressure inside the joint is larger than the outside pressure. If the reverse is the case, the sealing operation is unchanged except the packing ring 22 is now squeezed, by the fluid pressure, against the left end (Figure 1) of its groove 20.

A shoulder 24 is formed at the inner end of the chamber 14, said shoulder being engageable by the collar 18 to limit axial travel of the tube 10 into the body member 12. Axial separation of the tube 10 from the body member 12 is prevented by a split ring 26 which is designed to snap radially outwardly into a groove 28 adjacent the outer end of the chamber 14. If the internal diameter of the split ring 26 is small enough it will be engageable by the collar 18 to prevent axial movement of said collar and the tube 10 out from the chamber 14.

The split ring 26 preferably is of the type illustrated in Figure 2 in which the split ends of the ring are provided with inturned ears 30 having holes 32 to facilitate insertion and removal of said ring. In addition the radial width of the ring varies, as illustrated, so that, throughout its range of diametrical contraction or expansion, its external periphery always approximates a circle. Such split rings are commercially available only in a limited number of sizes. Therefore, in a given installation, it may be difficult to provide sufficient radial overlap between the internal diameter of the split ring 26 and the external diameter of the outer end of the collar 18. In such a situation, an annular metallic washer 34 is interposed between the split ring 26 and the collar, as illustrated, whereby axial separation of the tube 10 and the body member 12 is prevented by abutment of the collar 18 and the split ring 26 with the interposed metallic washer 34.

The axial length of the collar 18 is substantially less than the axial distance between the metallic washer 34 and the shoulder 24 whereby said collar can assume any axial position between said shoulder and washer. This construction permits substantial variation in the length of the tube 10 without affecting the tightness of the joint between said tube and the body member 12 and without imposing any stress on said tube or body member. In addition, the small clearance between the channel sides of the collar 18 and the internal wall of the chamber 14 permits slight angularity between the tube 10 and the body member 12 without subjecting said tube and member to bending stresses and without affecting the tightness of the joint therebetween. Another feature of the joint between the tube 10 and the body member 12 is that there is no rigid mechanical connection between said tube and member. Actually the resilient rubber-like packing ring 22 is disposed between the tube 10 and the body member 12 whereby said ring tends to vibrationally isolate said tube and body member.

The resilient rubber-like packing ring 22 is disposed within the groove 20 prior to assembly of the tube 10 and the body member 12. In assembling the tube 10 and the body member 12, said tube with its collar 18 and packing ring 22 is inserted into the chamber 14 in said body member. Then the split ring 26 is snapped into position within the groove 28 within the chamber 14 to complete the assembly. No other operation or adjustment is necessary to insure tightness or completeness of the joint between the tube 10 and the body member 12. As a result of the provision of the split ring 26 for locking the elements of the joint together, it is impossible for the installer to tighten the joint too much or too little. In addition, because of the split ring 26, the joint is relatively light in weight and occupies only a small amount of space. To disengage the joint between the tube 10 and body member 12 it is only necessary to contract the split ring 26 sufficiently so as to remove said ring from its groove 28 whereby the tube 10 can be pulled out from its associated body member 12.

In order that the resilient packing ring provides a fluid tight joint between the tube 10 and the body member 12 under high fluid pressures as under low fluid pressures, it is essential that the inner and outer annular walls, engaged by said packing ring, be accurately made so that their respective diametrical dimensions are fixed between only small manufacturing tolerances. The construction of Figure 1 permits this accurate fabrication since both the internal diameter of the bore or chamber 14 and the diameter of the bottom of the groove 20 can readily be machined quite accurately.

The resilient packing ring can be disposed directly about the thin walled tube if the external diameter of said tube can be obtained within the necessary small manufacturing tolerance required by said packing ring for a good fluid tight joint. Figure 4 illustrates such a construction.

In Figure 4, a thin walled tube 40 extends into a body member 42 having a chamber or bore 44 opening therein. A collar 46 is secured to and about the tube 40—for example by welding or brazing—at a substantial distance from the end of said tube. The collar 46 is disposed within the chamber 44 and is spaced axially outwardly of an annular shoulder 48 formed at the bottom of said chamber. A resilient packing ring 50 of rubber-like material is disposed between the collar 46 and the shoulder 48. As in Figure 1, the resilient packing ring 50 has a circular cross-section in its free condition and has a free internal diameter smaller than the outer diameter of the tube 40 engaged thereby and has a free external diameter larger than the internal diameter of the bore 44 engaged thereby.

The inner end of the tube 40 extends inwardly into the body member 42 beyond the shoulder 48 toward another shoulder 52, said latter shoulder limiting travel of the tube 40 into the body member 42. The axial dimensions of the joint are such that the end of the tube 40 engages the shoulder 52 before the packing ring 50 is squeezed between the shoulder 48 and the collar 46. Accordingly, as in Figure 1, regardless of the axial position of the tube 40 in the member 42 the axial dimensions of the annular space within which the resilient packing ring 50 is disposed is always larger than the width of said ring when said ring is disposed in said space.

Axial separation of the tube 40 out from the body member 42 is prevented by a split ring 54 which snaps or expands radially outwardly into an annular groove adjacent the open end of the chamber 44. In addition a metallic washer 56 may be disposed between the split ring 54 and the collar 46 for the same reasons discussed in connection with the washer 34 of Figure 1.

Assembly of the joint illustrated in Figure 4 is accomplished in essentially the same manner as the joint of Figure 1. Thus, after the packing ring 50 is slipped over the end of the tube 40 said tube is inserted into the chamber 44 of the member 42 and then the split ring 54 is snapped into position to complete the assembly.

With this construction of Figure 4, it is not necessary that the collar 46 be secured to the tube 40 in fluid tight relation in order that the joint be fluid tight. In Figure 1 it is essential to the fluid tightness of the joint, that the junction between the collar 18 and its tube 10 be fluid tight. However, the construction of Figure 1 has the advantage in that the rubber-like packing ring 22 remains in position on its tube 10 when the joint is disassembled whereas with the construction of Figure 4, the packing ring 50 tends to slip off the end of its tube 40 when the joint is disassembled. In addition, in Figure 1 it is not essential that the external diameter of its tube 10 be made as accurately as the tube 40 of Figure 4 in order to insure a fluid tight junction under a large range of fluid pressures.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications.

I claim as my invention:

1. A fluid tight joint comprising a first tubular member; a collar disposed about and secured to said first member; a second member having a chamber with an open end, said chamber having an annular groove formed in its wall and adjacent to its said open end with said groove facing radially inwardly into said chamber, said first member extending into said chamber with its said collar disposed within said chamber axially inwardly of said annular groove; a ring received within said annular groove and projecting radially inwardly therefrom into said chamber for retaining said collar and first member within said chamber; and an annular packing ring of resilient rubber-like material disposed within said chamber in an annular space about said first member, said packing ring being radially compressed in said annular space and having a free external diameter greater than that portion of the radially outer wall of said space engaged by said packing ring and having a free internal diameter smaller than that portion of the radially inner wall of said space engaged by said packing ring.

2. A fluid tight joint as recited in claim 1 in which said first mentioned ring is split to facilitate insertion and removal of said ring from said annular groove.

3. A fluid tight joint comprising a first tubular member having a collar disposed about and secured to said first member, said collar having an external annular groove disposed between its ends; a second member having a chamber with an open end, said chamber having an annular groove formed in its wall adjacent to its said open end with said groove facing radially inwardly into said chamber, said first member extending into said chamber with its said collar disposed within said chamber axially inwardly of said annular chamber groove; a split ring received within said annular chamber groove and projecting radially inwardly therefrom into said annular chamber groove for retaining said collar and first member within said chamber; and an annular packing ring of resilient rubber-like material disposed within the external groove in said collar, said packing ring being radially compressed between the bottom of said external groove and the adjacent wall of said chamber and having a free external diameter greater than that portion of the wall of said chamber engaged by said packing ring and having a free internal diameter smaller than the bottom of said external groove.

4. A fluid tight joint as recited in claim 3 in which said second member has a shoulder facing the open end of its chamber and disposed axially inwardly of its annular groove for limiting travel of the first member into said chamber.

5. A fluid tight joint as recited in claim 4 in which said collar is disposed axially between said split ring and shoulder and the axial length of said collar is small enough to permit limited axial movement of said collar and its first member between said split ring and shoulder.

6. A fluid tight joint comprising a first tubular member having a collar disposed about and secured to said first member adjacent to but spaced from an end of said member; a second member having a chamber with an open end, said chamber having an annular groove formed in its wall adjacent to its said open end with said groove facing radially inwardly into said chamber, said chamber also having an annular shoulder facing the open end of said chamber and spaced axially inwardly of said annular chamber groove, said first member extending into said chamber with its said collar disposed within said chamber between said chamber shoulder and annular groove; a split ring received within said annular chamber groove and projecting radially inwardly therefrom into said chamber for cooperation with said collar to retain said collar and first member within said chamber; and an annular packing ring of resilient rubber-like material radially compressed in the annular space about said first member between said collar and said shoulder, said packing ring having a free external diameter greater than that portion of the wall of said chamber engaged by said packing ring and having a free internal diameter smaller than that portion of said first member engaged by said packing ring.

7. A fluid tight joint as recited in claim 6 in which means are provided to prevent travel of said first member into said chamber to an extent sufficient to squeeze said packing ring between said collar and shoulder.

HARRY N. PRICE.

REFERENCES CITED

The following references are of record in the file of this patent:

UNITED STATES PATENTS

| Number | Name | Date |
|---|---|---|
| 2,412,664 | Wolfram | Dec. 17, 1946 |

FOREIGN PATENTS

| Number | Country | Date |
|---|---|---|
| 107,280 | Australia | Apr. 26, 1939 |
| 115,326 | Australia | June 10, 1942 |